US006646568B2

(12) United States Patent
MacPhail et al.

(10) Patent No.: US 6,646,568 B2
(45) Date of Patent: Nov. 11, 2003

(54) SYSTEM AND METHOD FOR AUTOMATED PARKING

(75) Inventors: Margaret Gardner MacPhail, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/964,934

(22) Filed: Sep. 27, 2001

(65) Prior Publication Data

US 2003/0058081 A1 Mar. 27, 2003

(51) Int. Cl.[7] ................................................ B60Q 1/48

(52) U.S. Cl. .................... 340/932.2; 340/905; 340/928; 340/995; 340/937; 340/933; 340/906; 340/991

(58) Field of Search ............................. 340/932.2, 905, 340/928, 995, 937, 933, 904, 991

(56) References Cited

U.S. PATENT DOCUMENTS

| | | | | | |
|---|---|---|---|---|---|
| 3,402,289 | A | | 9/1968 | Burke | 246/167 |
| 3,729,706 | A | | 4/1973 | Hein | 340/31 R |
| 4,167,785 | A | | 9/1979 | McReynolds et al. | 364/437 |
| RE31,044 | E | | 9/1982 | McReynolds et al. | 364/437 |
| 5,091,727 | A | * | 2/1992 | Mahmood | 340/932.2 |
| 5,150,116 | A | | 9/1992 | West | 340/928 |
| 5,444,442 | A | | 8/1995 | Sadakata et al. | 340/916 |
| 5,504,482 | A | | 4/1996 | Schreder | 340/995 |
| 5,530,441 | A | | 6/1996 | Takatou | 340/937 |

(List continued on next page.)

FOREIGN PATENT DOCUMENTS

| | | |
|---|---|---|
| GB | 2349000 A | 10/2000 |
| WO | WO9709218 | 3/1997 |

OTHER PUBLICATIONS

Research Disclosure by International Business Machines Corp., No. RD 421140, May 1999, "RFID for Traffic Control".

(List continued on next page.)

*Primary Examiner*—Daniel J. Wu
*Assistant Examiner*—Tai T. Nguyen
(74) *Attorney, Agent, or Firm*—Sawyer Law Group LLP; Leslie VanLeeuwen

(57) ABSTRACT

A parking control system is disclosed. The parking control system comprises a plurality of vehicles. A portion of the plurality of vehicles occupies parking spaces in a parking lot. At least one of the vehicles is attempting to park in a parking space of the parking lot. At least one of the plurality of vehicles is capable of a two-way communication. The parking control system also includes a parking controller. The parking controller receives and provides information to the plurality of vehicles. The parking controller can communicate the most appropriate parking space to the vehicle that is attempting to park. In a method and system in accordance with the present invention, a parking controller monitors a parking lot and can be in direct contact with the vehicles. The parking controller receives and transmits information to and from the vehicles and allows for an overall view of the parking lot to be understood. Accordingly, through the use of the parking controller system, parking is controlled more accurately and automatically.

37 Claims, 7 Drawing Sheets

U.S. PATENT DOCUMENTS

| | | | | | |
|---|---|---|---|---|---|
| 5,539,398 | A | | 7/1996 | Hall | 340/907 |
| 5,671,563 | A | | 9/1997 | Marcum | 49/49 |
| 5,748,107 | A | * | 5/1998 | Kersken et al. | 340/905 |
| 5,758,313 | A | | 5/1998 | Shah | 701/208 |
| 5,845,268 | A | * | 12/1998 | Moore | 705/418 |
| 5,852,411 | A | * | 12/1998 | Jacobs et al. | 340/932.2 |
| 5,875,399 | A | | 2/1999 | Kallin | 455/434 |
| 5,910,782 | A | * | 6/1999 | Schmitt et al. | 340/995 |
| 5,917,898 | A | | 6/1999 | Bassa | 379/133 |
| 5,926,113 | A | | 7/1999 | Jones | 340/906 |
| 5,940,481 | A | * | 8/1999 | Zeitman | 379/114 |
| 5,948,040 | A | | 9/1999 | DeLorme | 701/201 |
| 5,983,161 | A | | 11/1999 | Lemelson | 701/301 |
| 5,986,575 | A | | 11/1999 | Jones | 340/906 |
| 6,012,012 | A | | 1/2000 | Fleck | 701/117 |
| 6,024,510 | A | | 2/2000 | Kamienchick | 404/15 |
| 6,084,510 | A | | 7/2000 | Lemelson | 340/539 |
| 6,104,316 | A | | 8/2000 | Behr | 340/995 |
| 6,107,944 | A | | 8/2000 | Behr | 340/995 |
| 6,112,152 | A | | 8/2000 | Tuttle | 701/115 |
| 6,124,807 | A | | 9/2000 | Heckeroth | 340/908 |
| 6,133,854 | A | | 10/2000 | Yee | 340/907 |
| 6,137,531 | A | | 10/2000 | Kanzaki | 348/149 |
| 6,147,624 | A | * | 11/2000 | Clapper | 340/932.2 |
| 6,160,493 | A | | 12/2000 | Smith | 340/902 |
| 6,161,071 | A | | 12/2000 | Shuman | 701/48 |
| 6,167,333 | A | | 12/2000 | Gehlot | 701/35 |
| 6,167,345 | A | | 12/2000 | Strandberg | 701/117 |
| 6,173,231 | B1 | | 1/2001 | Chojnacki | 701/208 |
| 6,185,484 | B1 | | 2/2001 | Rhinehart | 701/1 |
| 6,199,045 | B1 | | 3/2001 | Giniger | 705/1 |
| 6,202,023 | B1 | | 3/2001 | Hancock | 701/201 |

OTHER PUBLICATIONS

Research Disclosure by International Business Machines Corp., No. RD 433061, "Automatic PDA/Server–based solution of navigation path planning".

Avivi, D., *Automatic Vehicle Identification*, CH3031–2/91/0000; pp. 96–99.

Tarry, S., et al., *Development of a Lorry Monitoring and Identification System*, Castle Rock Consultants, UK; University of Nottingham, UK.

Shaw, L., *On Optimal Ramp Control of Traffic Jam Queues*, 1971 IEEE Conference on Decision & Control, Miami Beach, Florida, Paper No. F4–1, pp. 479–483.

Lee, J.H., *A Real–Time Traffic Control Scheme of Multiple AGV Systems for Collision Free Minimum Time Motion: A Routing Table Approach*, IEEE Ttransactions on Systems, Man, and Cybernetics—Part a: Systems and Humans, vol. 28, No. 3, May 1998.

Gupta, A., et al., *Parallel Algorithms for Vehicle Routing Problems*, IEEE 1094–7256/97, pp. 144–151.

Schalkwijk, *Simulation of Traffic Flow through Large Traffic Nets*, Verkeer en Verkeerstechniek, Nov. 1, 1968, pp. V45–V51.

Journet, B., *Laser Rangefinders for Autonomous Intelligent Cruise Control Systems*, SPIE vol. 3207·0277–786X/98, pp. 65–71.

Beros, S., et al., *The Vehicle Recognition Based on Adaptive Logic Network*, Automatizacija u prometu '96, Split, Ancona 27–29. 11. 1996., pp. 28–33.

Hamamatsu, Y., *Approximate Solution of Vehicle Behavior under Time Limit for Merging at an Intersection of AGT*, Modelling, Simulation and Identification, Proceedings of IASTED Intl. Conf., Wakayama, Japan, Sep. 12–16, 1994, pp. 183–186.

Fijalkowski, B.T., et al., *Concept for a Mechatronically Controlled Full–time 4WDx4WBx4WAx4WS Intelligent Vehicle for Drivers with Special Needs*, ISATA 1994 Proceedings, vol. 4, pp. 161–172.

Janko, J., *An Algorithm for an Incident Management in a Route Guidance System*, IFAC Control, Computers, Communications in Transportation, Paris, France 1989, pp. 277–277–280.

Yagoda, HN, *The Dynamic Control of Automotive Traffic at a Freeway Entrance Ramp*, automatica, vol. 6, No. 3, May 1970, pp. 393.

Bates, et al., *A Distributed System and Method for Detecting Traffic Patterns*, US patent application under prosecution by International Business Machines Corp., IBM Docket No. ROC9–1999–0206.

* cited by examiner

200

SYSTEM AND METHOD FOR AUTOMATED PARKING

FIELD OF THE INVENTION

The present invention relates generally to the parking of vehicles and more particularly to the automated parking thereof.

BACKGROUND OF THE INVENTION

Commercial environments typically include parking lots to allow for customers or employees or visitors or the like to park their vehicles. In some locations, as parking becomes very difficult and there are, for example, areas designated for handicapped individuals or the executives within the company or some other way of insuring that an individual obtains parking. However, there are many environments where it is impossible to tell whether there are parking spaces except for the blanket "no parking" sign at the entrance of the parking lot, for example.

Accordingly, oftentimes individuals driving a vehicle may have to search for a parking spot in the parking structure. A good example of this is when parking at an airport, airport short term or long term parking, where during the holiday season it may be very busy and the parking lot is virtually full and the occupant of the vehicle can not adequately ascertain whether a space is available. Another example is in a shopping mall area where there is limited parking in a parking structure and the user of a vehicle must search for a parking space. This can be time consuming and tedious.

Accordingly, what is desired is a system and method for allowing an occupant of a vehicle to be able to quickly and accurately park in a structure. The system must be easy to operate, must be compatible with existing systems and must be cost effective. The present invention addresses such a need.

SUMMARY OF THE INVENTION

A parking control system is disclosed. The parking control system comprises a plurality of vehicles. A portion of the plurality of vehicles occupies parking spaces in a parking lot. At least one of the vehicles is attempting to park in a parking space of the parking lot. At least one of the plurality of vehicles is capable of a two-way communication. The parking control system also includes a parking controller. The parking controller receives and provides information to the plurality of vehicles. The parking controller can communicate the most appropriate parking space to the vehicle that is attempting to park.

In a method and system in accordance with the present invention, a parking controller monitors a parking lot and can be in direct contact with the vehicles. The parking controller receives and transmits information to and from the vehicles and allows for an overall view of the parking lot to be understood. Accordingly, through the use of the parking controller system, parking is controlled more accurately and automatically.

DETAILED DESCRIPTION

The present invention relates generally to the parking of vehicles and more particularly to the automated parking thereof. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
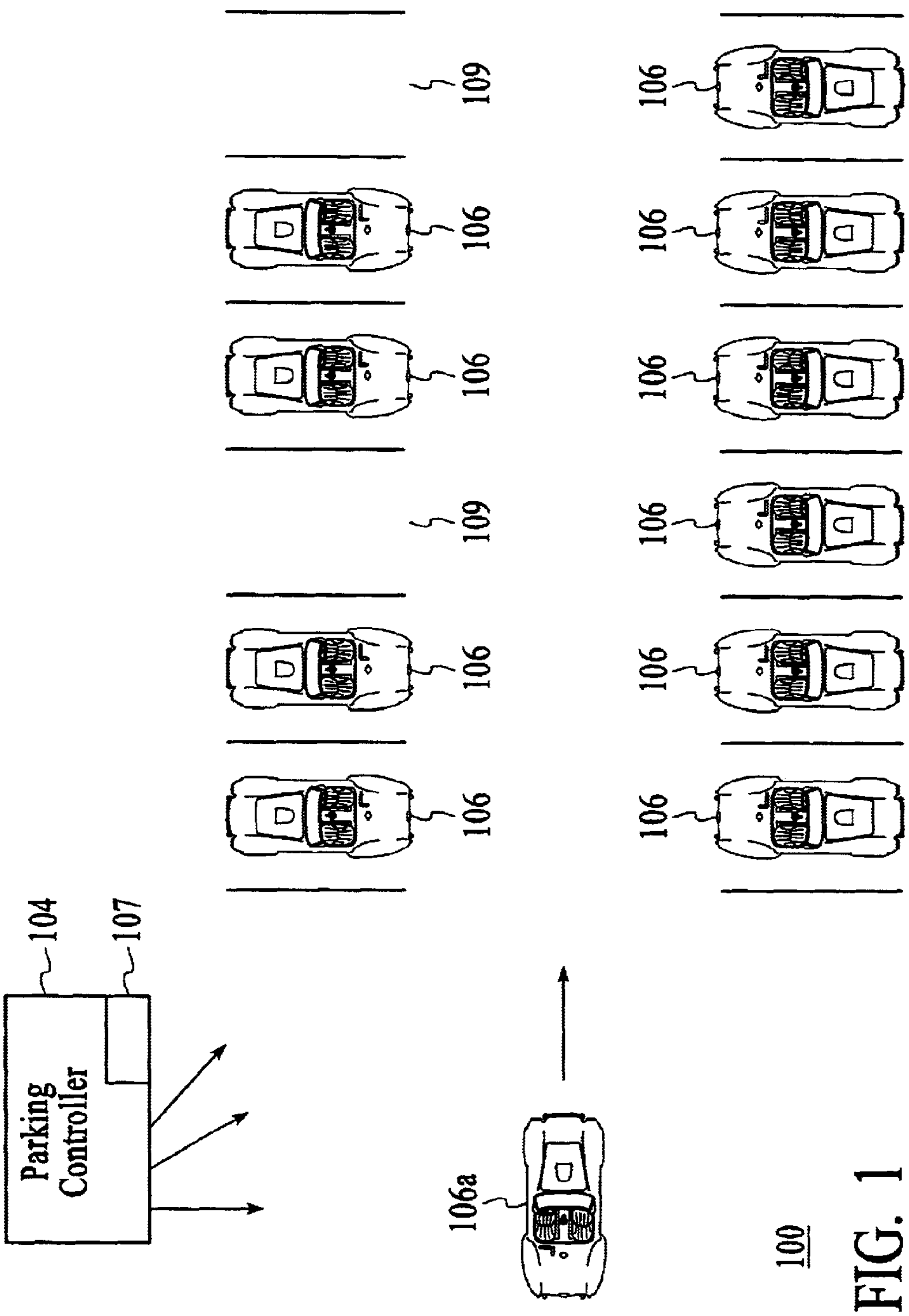
FIG. 1 is a block diagram of a parking control system in accordance with the present invention.

FIG. 1 is a block diagram of a parking control system 100 in accordance with the present invention. The parking control system 100 could be part of a traffic control system, such as that described in co-pending patent application Ser. No. 09/964,933, entitled Hierarchical Traffic Control System, filed on Sep. 27, 2001, and assigned to the assignee of the present application, or the parking control system 100 could be a stand-alone system. The parking control system 100 comprises a parking controller 104 that determines where the parking spaces are within the parking lot. In this system as is seen there are a plurality of vehicles 106 occupying the parking spaces of the parking lot. In this embodiment there are two empty parking spaces 109. A vehicle 106*a* upon entering the parking lot can communicate information about its size, length, width, etc., to the parking controller, and the parking controller 104 will then indicate to the vehicle 106*a* the most appropriate parking space 109 based upon input from the parking controller 104.

The parking controller 104 could be automated or an individual could be located therewithin. For example, in an automated system, a computer could be optimizing parking in the parking lot. On the other hand, a human could be located within a parking controller 104 to ensure that the parking is optimized within the parking lot.

The parking controller 104 typically includes a server system 107 that is tracking each vehicle 106 within the parking lot. The server system 107 includes a predictive system which can calculate where a vehicle 106 is moving and how quickly it will reach its destination. Within the server system 107 is a database which is object oriented. That is, each of the databases includes a plurality of participant objects. These participant objects are utilized by the controller 104 to manage the operation of vehicles within the system.

Figure 2:
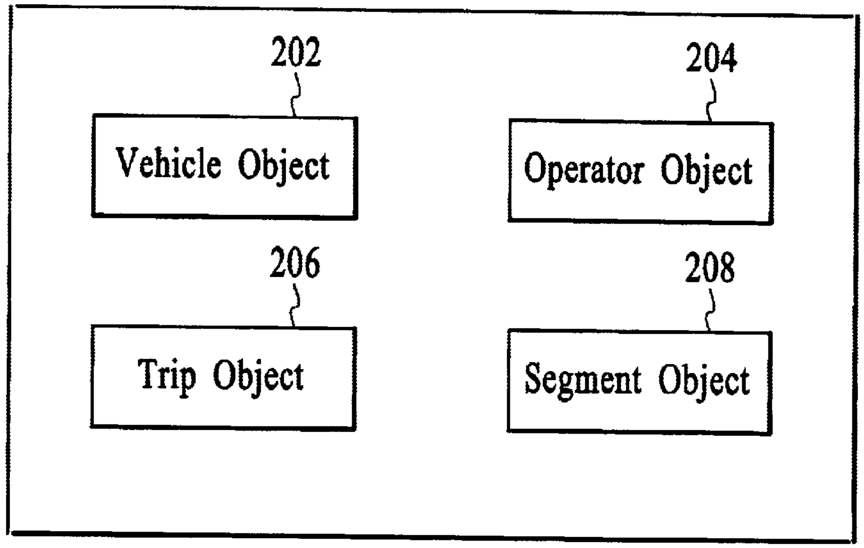
FIG. 2 illustrates a vehicle utilized with the system in accordance with the present invention.

FIG. 2 illustrates the plurality of participant objects in a participant pool 200. The participant pool 200 is within the database of the server within the controller. A participant object has three primary elements which interact and influence its behavior. One is the physical object being represented, a second is an operator who can manipulate or direct the object, and the third trip plan, in the case of mobile objects. In a preferred embodiment, objects that are available are a vehicle object 202, an operator object 204, a trip object 206, and a segment object 208. The functions and features of each of these objects are described in detail hereinbelow Vehicle Object 202

A vehicle object 202 typically includes the make, model and capabilities and limitations of the vehicle. For example, it would include the height, weight, maximum speed and the like.

Operator Object 204

An operator object 204 typically includes information about the operator. It would typically include height, weight, and age information. The operator object would also include the class of drivers license (i.e., learner's permit, limousine permit, etc.) and any capabilities, features or limitations of the operator.

Trip Object 206

A trip object 206 indicates the trip plan of the vehicle. The trip object 206 could come from a preplanned trip information, such as a trip to work or a vacation. The trip object 206 could be related to historical information, once again, repeated trips to work, for groceries or to a relative. Finally, the trip object 206 can be created such as from a current location to home.

Segment Object 208

Figure 3:
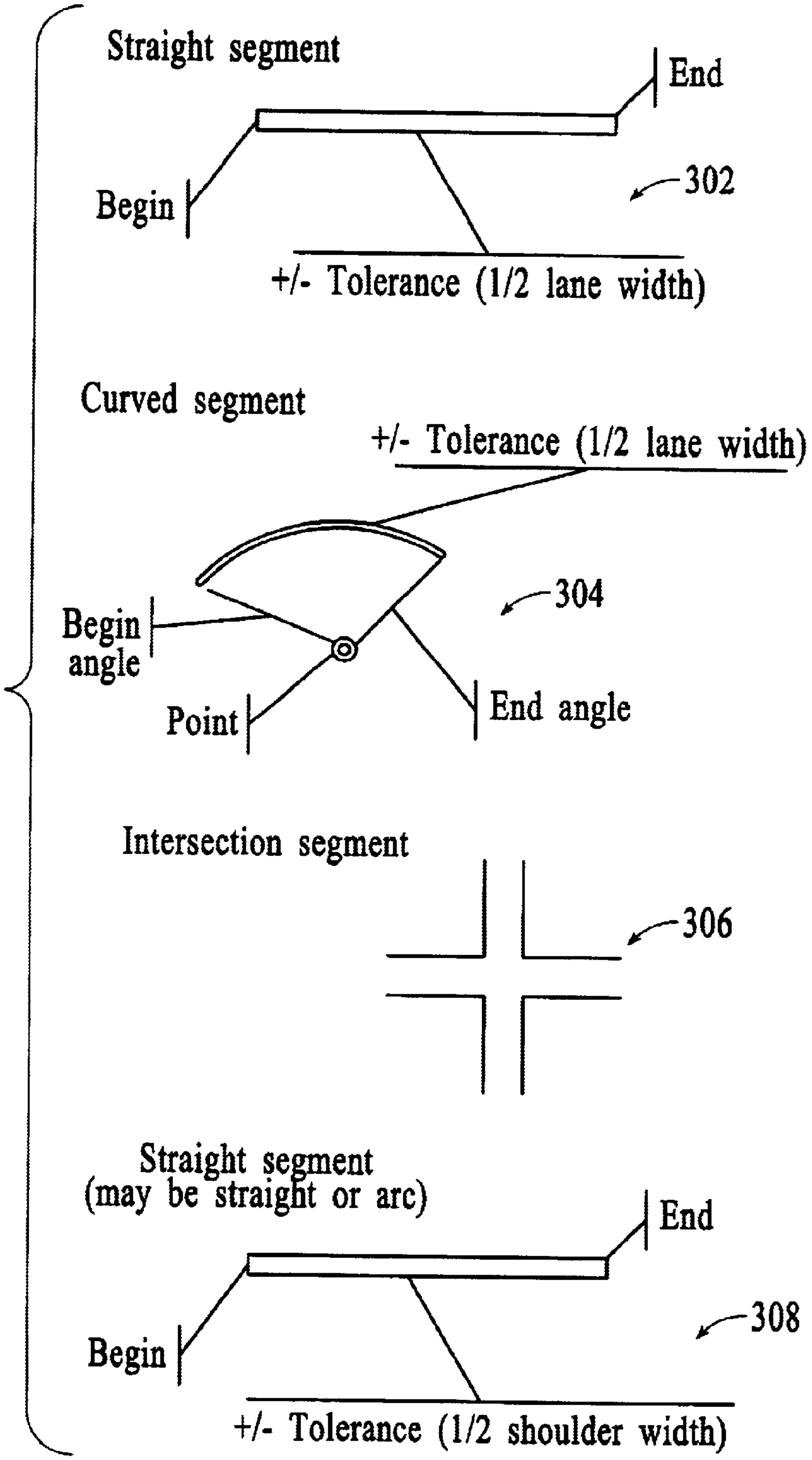
FIG. 3 illustrates the use of roles and permissions in a parking control system.

A segment object indicates information about a segment of the road within the controller's domain. FIG. 3 illustrates a plurality of segment objects within the parking lot in accordance with the present invention. The plurality of segment objects in a preferred embodiment include a straight segment object 302, a curve segment object 304, an intersection segment object 306 and shoulder intersection object 308. A straight segment object 302 has a beginning and an ending point, and for example, directionality from beginning to end may denote one direction and flags may, for example, denote that there is a two-way flow. In a preferred embodiment, the tolerance may be ±½ lane width to allow a particular vehicle to have the right of way therein. A curve segment object 304 has a begin angle, an end angle, and a point which denotes both of those angles. An intersection segment object 306 provides an array of ports which denote the entrances and exits to an intersection within the parking lot. A shoulder segment object 308 may be straight or an arc, may be a description of a surface like a drop-off and facilities like emergency telephones to allow for parking control.

The parking controller is computationally intensive due to the large number of objects and the large amount of information within each object. For example, on a parking lot, there may be several lanes, spaces and turns which are represented by segment objects, turn offs, shoulders, all of which are represented by segment objects, several vehicles of various sizes and classes, further represented by various participant objects. Accordingly, the parking controller could be implemented by supercomputers, by distributed processors or other compiling architectures to represent the participant objects in an effective and efficient manner.

Referring back to FIG. 1, the parking controller 104 can appropriately suggest a parking space for a vehicle based upon the controller's 104 determination of the vehicle's status based upon the participant objects associated with the particular vehicle. The controller 104 can appropriately indicate to a vehicle that a space is available based upon roles and permissions of the vehicle 106.

One of the features of the present invention is that a vehicle 106 can provide feedback to the parking controller 104. A vehicle 106 may automatically provide information about its condition by sending vehicle operation information. For example, the server system 107 within the controller 104 can receive information concerning whether a particular vehicle 106 can be parked in a handicapped area and the like. Commercial institutions can use vehicle permissions to their benefit by providing permissions to individual parking spaces—best customers park near the door. Parking lot operators can charge extra for premium spaces—not just premium lots by setting the permissions at the entry into the parking facility. The system can be utilized such that large vehicles can not have permission to park in compact slots. Parking for the handicapped can be enforced. For example, GPS and two-way communications can alert the driver of a violation and alert the parking police. Through the use of this system, the parking controller 104 can monitor the vehicles that enter the area and based on up-to-the minute data from other vehicles within the system can indicate where the vehicle should park.

Figure 4:
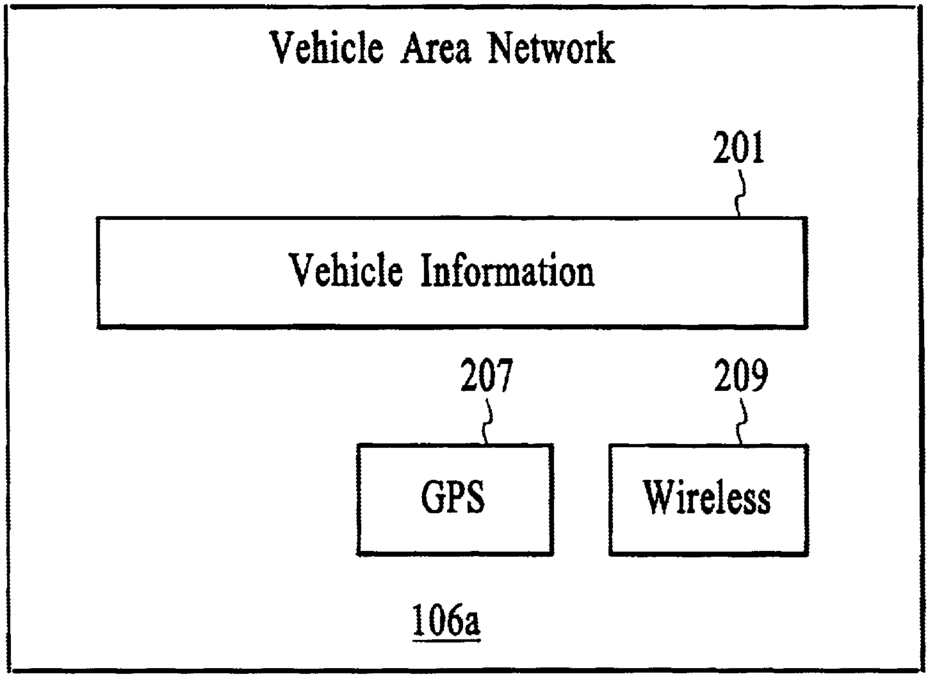
FIG. 4 illustrates a vehicle utilized within the system in accordance with the present invention.

FIG. 4 illustrates a vehicle 106*a* utilized within the system 100 in accordance with the present invention. Typically, an enabled vehicle 106*a* will include a vehicle area network that allows for the vehicle and its occupants to communicate with the parking controller 104. In this embodiment, the vehicle 106*a* includes a vehicle information system 201 that provides length, width, weight, etc. Although this particular vehicle information system 201 is shown in the vehicle area network, one of ordinary skill in the art recognizes there are a variety of other conditions or systems, that can be monitored and their use would be within the spirit and scope of the present invention.

The vehicle 106*a* also includes wireless communications 209 and a global positioning system (GPS) location apparatus 207 therewithin. The wireless communications 209 allow for two-way communication between the vehicle 106*a* and the parking controller 104. The GPS location system 207 could be used in a variety of fashions. For example, the GPS location system can be within a vehicle, or triangulation on a cell phone or some other wireless scheme.

Accordingly, the occupant of the vehicles 106*a* can communicate with the parking controller 104 directly to ensure that specific issues are addressed via voice communication. In addition, the location of a vehicle 106 in a parking lot can be tracked using the GPS location system 210.

One of the features of the present invention is that a vehicle can provide feedback to the parking controller 104. A vehicle may automatically provide information about its condition by sending vehicle operation information. This vehicle information is added to the vehicle object within the controller. For example, the database within the controller can send information to the vehicle about the parking spaces for that particular vehicle upon entrance into the parking lot. The vehicle upon entering can provide vehicle information to the vehicle object of the database and the controller can provide information as to the particular parking spaces that will accommodate the vehicle based upon the vehicle's size, weight, permissions, etc.

Figure 5:
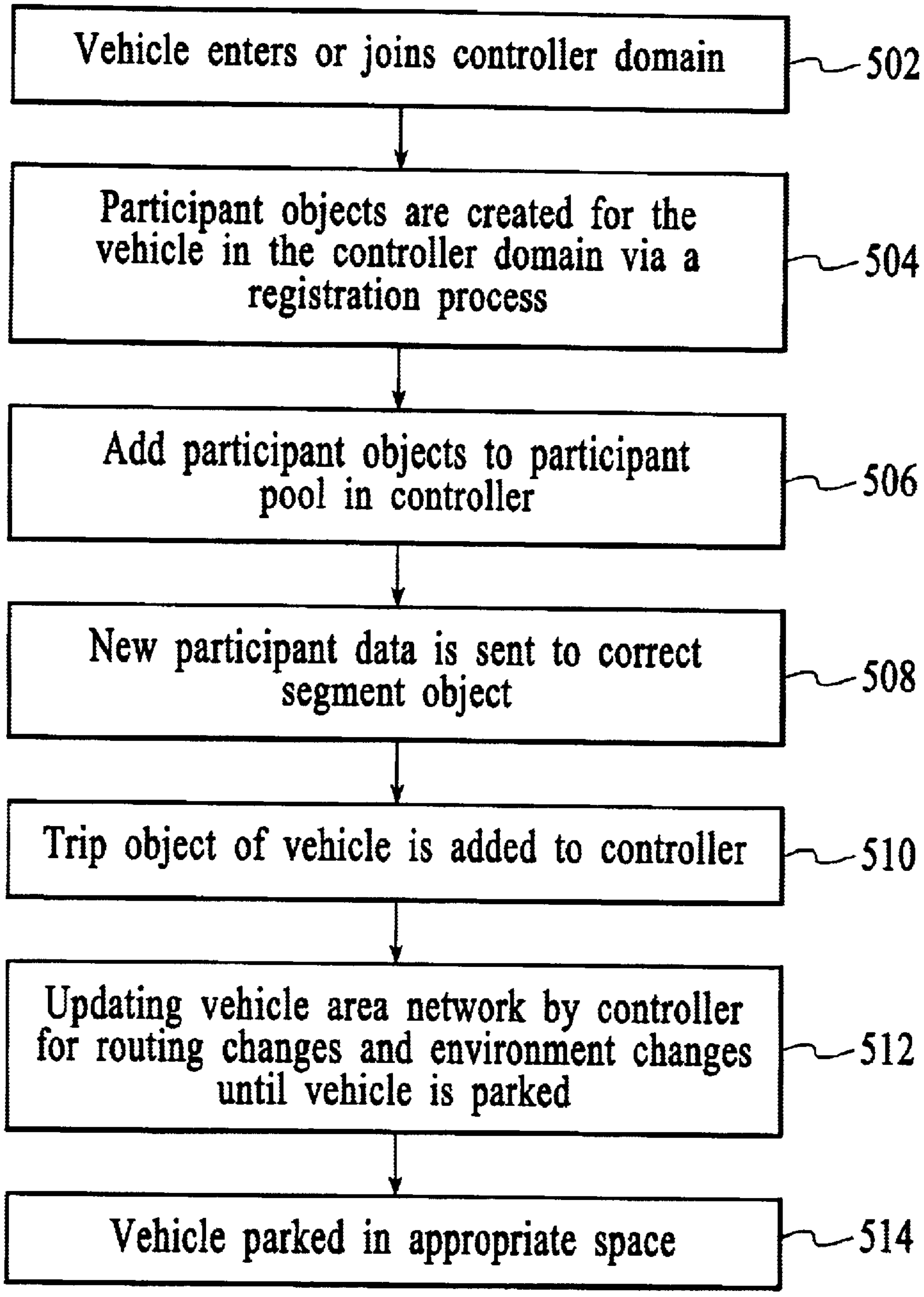
FIG. 5 is a flowchart illustrating operation of a controller when receiving information from and providing information to a vehicle.

Information about the vehicle and segments is utilized by the controller to effectively route vehicles to appropriate parking spaces. To more specifically describe their interaction, refer now to the following description in conjunction with the accompanying figures. These interactions will be described from different viewpoints. FIG. 5 is a flow chart illustrating operation of a controller when receiving information from and providing information to a vehicle.

Figure 6:
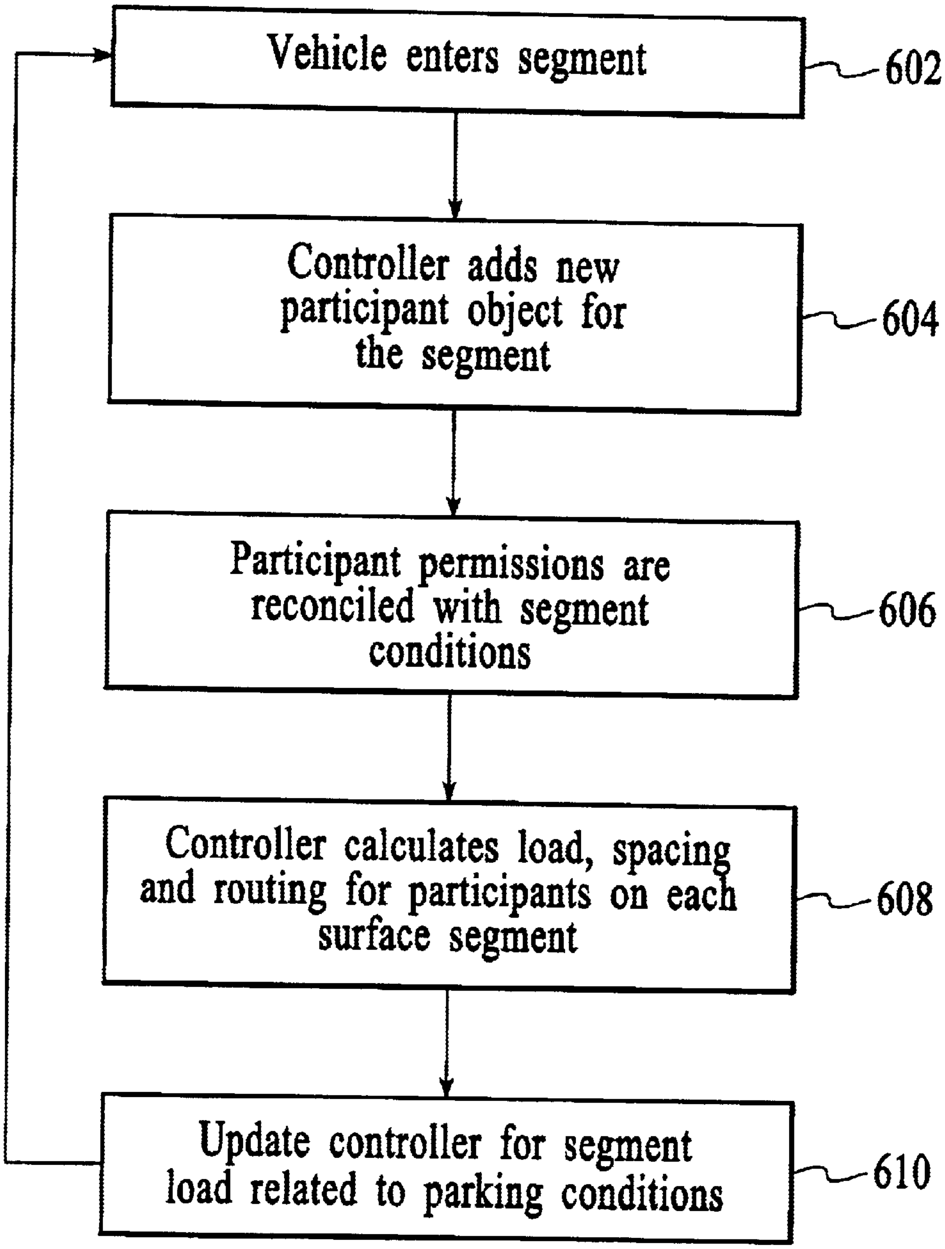
FIG. 6 is a flowchart illustrating the use of a segment object when vehicles are traveling through a segment associated with the segment object.

FIG. 6 is a flow chart illustrating the use of a segment object when vehicles are traveling through a segment associated with the segment object.

FIG. 5 illustrates a controller interaction with the vehicle and the segments. First, a vehicle enters or joins a controller domain, via step 502. The vehicle area network when it enters the controller domain provides a plurality of information to the database of the controller as above described. Initially, participant objects are created for the vehicle in the controller domain via a registration process, via step 504. These participant objects are then added to the participant pool in the controller, via step 506. The new participant data is then sent to the correct segment object within the controller, via step 508, so that the particular segment object has information within it relating to all the vehicles within that particular segment. In addition, a trip object vehicle is added to the controller, via step 510. Thereafter the vehicle area network is updated by the controller for routing changes, environment changes within the segment, via step 512. This updating step 512 continues until the vehicle is parked in the appropriate space, via step 514. As can be seen, the vehicle area network, the segment objects and the controller interact to allow for a vehicle to effectively traverse a domain of the parking controller.

To describe the use of the segment object when vehicles are traveling through a segment associated with that segment object, refer now to the following. Referring now to FIG. 6, first a vehicle moves into a new segment, via step 602. Next, a controller adds the new participant object for this segment, via step 604. The controller then determines the number of participants in the segment, the permissions that each participant within the segment has and reconciles that for segment conditions to provide for appropriate parking, via step 606. The controller then calculates the load spacing and routing for participants of each surface segment, via step 608. Thereby, the controller can manage the vehicle within the particular segment for parking and can provide information to vehicles within the segment about whether that particular segment is a good place to find adequate parking. Finally, the controller is updated for segment load conditions related to parking, via step 610. This process 602–610 is repeated for each vehicle and as each vehicle comes into and leaves the particular segments that they are associated therewith. The vehicles within the various segments, that is, shoulder, curve, intersection, etc., segments, could interact in a variety of ways under the control of the controllers based on traffic conditions, weather conditions, and any other factors which could influence the parking within the parking lot.

Figure 7:
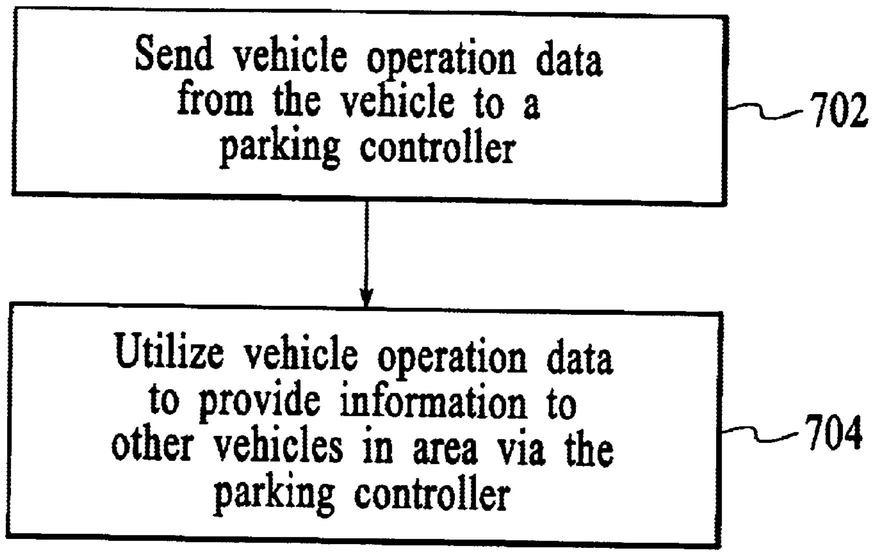
FIG. 7 is a flowchart illustrating a vehicle providing information to a controller within traffic control system.

Accordingly, data from the vehicle area network can be utilized by parking control system 102 to provide information concerning parking conditions. To describe this feature in more detail, refer now to the following discussion in conjunction with the accompanying figure. FIG. 7 is a flowchart illustrating a vehicle providing information to a controller within the traffic control system. First, data concerning vehicle operation is provided from the vehicle to the parking controller, via step 702. Thereafter, the parking controller provides the vehicle operation data to a vehicle object within its database. The controller utilizes the vehicle object to provide information to other vehicles in the area concerning parking, via step 704.

In a first embodiment, an anti-lock braking system passes skid data to a controller in the vehicle. The vehicle area network within the vehicle passes the data along with GPS location data to the controller. The controller analyzes the skid data for a plurality of vehicles, which are at that location to determine if there is a problem at the particular location and adds that information to the vehicle object.

In a second embodiment, a suspension system of the vehicle can be monitored by the vehicle. The data from the suspension system can be forwarded to the vehicle area network within the vehicle. The vehicle area network passes the suspension information along with the GPS location data to the parking controller. The controller then adds that information to the vehicle object. The subsidiary controller analyzes the suspension data from a plurality of vehicles passing through that GPS location and determines if the parking lot has potholes, obstructions and the like, that may impede parking.

Parking Control Based upon Roles and Permissions

Figure 8:
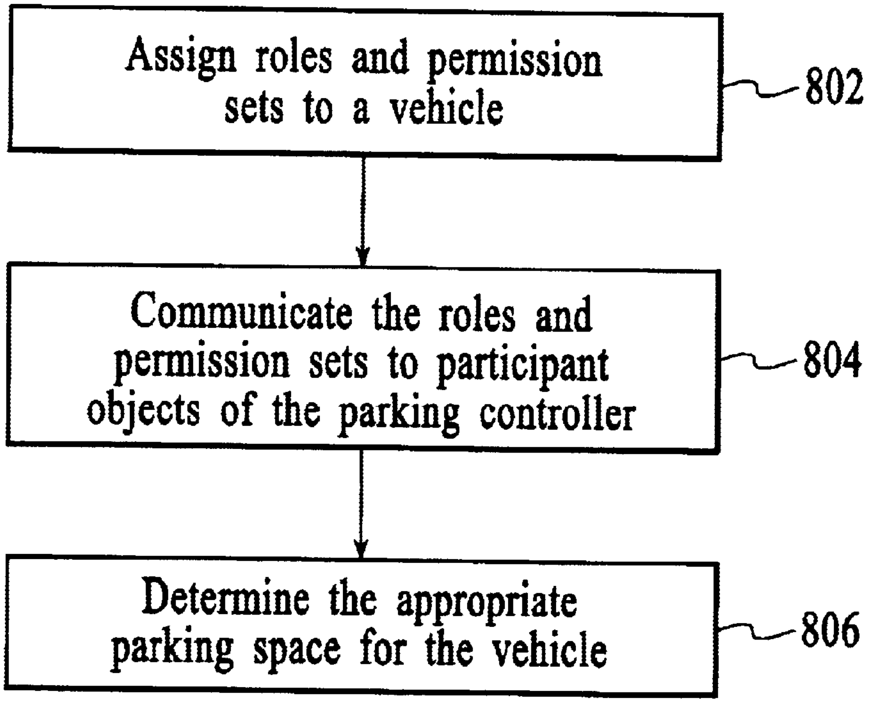
FIG. 8 illustrates the use of roles and permission in a parking control system.

The use of roles and permissions of a vehicle can be used by the parking control system 100 to control parking in the parking lot. FIG. 8 illustrates the use of roles and permissions in a parking control system. First, roles and permissions are assigned to a vehicle, via step 802. Next, the roles and permissions are communicated to the participant objects of the parking controller, via step 804. Then the parking controller communicates the most appropriate parking space based upon the roles and permissions of the vehicle, via step 306. In a preferred embodiment, the vehicle can communicate information through its vehicle area network to the parking controller.

Vehicles may have different roles and permissions based upon a specific circumstance, their use or other factors, or roles and permissions can be made changeable based upon circumstances. Hence, for example, a police car will have a different role and permissions for parking when a crime is being investigated. Likewise, a fire truck or emergency vehicle may have different roles and permissions for parking dependent upon the circumstances. In addition, the permissions could be upgraded en route based upon the vehicle operator information, GPS information and the wireless communication.

With GPS, two-way communications and car instrumentation for salient characteristics such as size and weight, a particular vehicle can negotiate a permission set for a particular parking lot. A system and method in accordance with the present invention uses the combination of a GPS location with two-way communication between a parking controller and a specific vehicle.

In a method and system in accordance with the present invention, a parking controller monitors a parking lot and can be in direct contact with the vehicles. The parking controller receives and transmits information to and from the vehicles and allows for an overall view of the parking lot to be understood. Accordingly, through the use of the parking controller system, parking is controlled more accurately and automatically.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A parking control system comprising:

a plurality of vehicles, a portion of the plurality of vehicles occupying parking spaces in a parking lot; at least one of the vehicles attempting to park in a parking space of the parking lot; the at least one of the plurality of vehicles being capable of a two-way communication; and a parking controller, the parking controller for receiving information from and providing information to the plurality of vehicles, wherein the parking controller can communicate the most appropriate parking space to the at least one vehicle, wherein the communications to the parking controller include roles and permissions which have been assigned to the vehicle, and wherein if the roles and permissions are violated, an appropriate action is taken by the parking control system.

2. The parking control system of claim 1 wherein the vehicle automatically sends information to the parking controller concerning location and vehicle information.

3. The parking control system of claim 2 wherein the vehicle includes a GPS location system, a voice communication system, and at least one vehicle operation system, wherein information concerning the vehicle operation can be communicated from any combination of the GPS location, the voice communication system and the vehicle information system.

4. The parking control system of claim 1 wherein the appropriate action could be any combination of rendering the at least one vehicle inoperative, notifying an agency or notifying an entity responsible for the at least one vehicle.

5. The parking control system of claim 1, wherein the parking controller determines the most appropriate parking space based at least in part on the communicated roles and permissions.

6. The parking control system of claim 5, wherein one of a plurality of different sets of roles and permissions is assigned to a vehicle based on current circumstances.

7. A The parking control system of claim 6, wherein the different sets of roles and permissions based on current circumstances include one set of roles and permissions that is assigned when a crime is being investigated, and another set of roles and permissions that is assigned when a crime is not being investigated.

8. The parking control system of claim 5, wherein different vehicles may have different roles and permissions from each other.

9. The parking control system of claim 8, wherein the different roles and permissions assigned to different vehicles is based on the use of the vehicle.

10. The parking control system of claim 9, wherein the use of the vehicle includes emergency services or law enforcement.

11. The parking control system of claim 8, wherein the different roles and permissions assigned to different vehicles is based on at least one characteristic of each vehicle.

12. The parking control system of claim 11 wherein the at least one characteristic includes the size of the vehicle, such that vehicles over a predetermined size do not have permission to park in parking spaces designated for compact vehicles.

13. The parking control system of claim 8 wherein the vehicle may park in a handicapped parking space designated for handicapped vehicle users if the vehicle has a permission to park in the handicapped parking space.

14. A method for controlling a vehicle by a parking control system, the method comprising the steps of:

(a) assigning roles and permission sets to the vehicle;

(b) communicating the roles and permission sets to the parking control system; and (c) determining an appropriate parking space for the vehicle based upon the roles and permission sets, wherein if the roles and permissions sets are violated an appropriate action is taken by the parking control system.

15. The method of claim 14 wherein the roles and permission sets are changeable based upon circumstances.

16. The method of claim 14 wherein the vehicle includes a GPS locationsystem, a wireless communication system, and a vehicle information system, wherein information concerning the vehicle can be communicated from any combination of the GPS location, the voice communication system and the vehicle information system.

17. The method of claim 16 wherein the vehicle can negotiate a permission based upon the GPS location system, the at least one vehicle operation system and the wireless communication system.

18. The method of claim 14 wherein the appropriate action could be any combination of rendering the at least one vehicle inoperative, notifying an agency or notifying an entity responsible for the at least one vehicle.

19. The method of claim 14, wherein one of a plurality of different sets of rolesand permissions is assigned to the vehicle based on current circumstances.

20. The method of claim 19, wherein the different sets of roles and permissions include one set of roles and permissions assigned when a crime is being investigated, and another set of roles and permissions assigned when a crime is not being investigated.

21. The method of claim 14, wherein different vehicles may have different roles and permissions from each other.

22. The method of claim 21, wherein the different roles and permissions assigned to different vehicles is based on the use of the vehicle.

23. The method of claim 22, wherein the use of the vehicle includes emergency services or law enforcement.

24. The method of claim 22, wherein the different roles and permissions assigned to different vehicles is based on at least one characteristic of each vehicle.

25. The method of claim 24 wherein the at least one characteristic includes the size of the vehicle, such that vehicles over a predetermined size do not have permission to park in parking spaces designated for compact vehicles.

26. The method of claim 21 wherein the vehicle may park in a handicapped parking space designated for handicapped vehicle users if the vehicle has a permission to park in the handicapped parking space.

27. A parking control system comprising:

a plurality of vehicles, a portion of the plurality of vehicles occupying parking spaces in a parking lot; at least one of the vehicles attempting to park in a parking space of the parking lot; the at least one of the plurality of vehicles being capable of a two-way communication; and a parking controller, the parking controller including a plurality of participant objects, the parking controller for receiving and providing information to the plurality of vehicles, via at least one of the plurality participant objects, wherein the parking controller can communicate the most appropriate parking space to the at least one vehicle, wherein the communications to the parking controller includes roles and permissions which have been assigned to the at least one vehicle and wherein if the roles and permissions are violated an appropriate action is taken by the parking control system.

28. The parking control system of claim 27 wherein the vehicle automatically sends information to a participant object of the parking controller concerning location and vehicle information.

29. The parking control system of claim 28 wherein the vehicle includes a GPS location system, a voice communication system, and at least one vehicle operation system, wherein information concerning the vehicle operation can be communicated from any combination of the GPS location, the voice communication system and the vehicle information system.

30. The parking control system of claim 27 wherein the appropriate action could be any combination of rendering the at least one vehicle inoperative, notifying an agency or notifying an entity responsible for the at least one vehicle.

31. A method for controlling a vehicle by a parking control system, the method comprising the steps of:

(a) assigning roles and permission sets to the vehicle;

(b) communicating the roles and permission sets to a participant object of the parking control system; and (c) determining an appropriate parking space for the vehicle based upon the roles and permission sets, wherein if the roles and permissions sets are violated an appropriate action is taken by the parking control system.

32. The method of claim 31 wherein the roles and permission sets within the participant object are changeable based upon circumstances.

33. The method of claim 31 wherein the vehicle includes a GPS location system, a wireless communication system, and a vehicle information system, wherein information concerning the vehicle can be communicated from any combination of the GPS location, the voice communication system and the vehicle information system.

34. The method of claim 33 wherein the vehicle can negotiate a permission based upon the GPS location system, the at least one vehicle operation system and the wireless communication system.

35. The method of claim 31 wherein the appropriate action could be any combination of rendering the at least one vehicle inoperative, notifying an agency or notifying an entity responsible for the at least one vehicle.

36. A computer readable medium containing program instructions for controlling a vehicle by a parking control system, the program instructions for:

(a) assigning roles and permission sets to the vehicle;

(b) communicating the roles and permission sets to the parking control system; and (c) determining an appropriate parking space for the vehicle based upon the roles and permission sets, wherein if the roles and permissions sets are violated an appropriate action is taken by the parking control system.

37. A parking control system comprising:

a plurality of vehicles, a portion of the plurality of vehicles occupying parking spaces in a parking lot; at least one of the vehicles attempting to park in a parking space of the parking lot; the at least one of the plurality of vehicles being capable of a two-way communication; and a parking controller, the parking controller for receiving and providing information to the plurality of vehicles, wherein the parking controller can communicate the most appropriate parking space to the at least one vehicle, wherein the communications to the parking controller from the vehicle includes roles and permissions assigned to the vehicle and wherein if the permission is violated an appropriate action is taken by the parking control system, wherein the roles and permissions set of the at least one vehicle is changeable based upon a specific circumstance.

* * * * *

UNITED STATES PATENT AND TRADEMARK OFFICE

CERTIFICATE OF CORRECTION

PATENT NO. : 6,646,568 B2
DATED : November 11, 2003
INVENTOR(S) : MacPhail et al.

It is certified that error appears in the above-identified patent and that said Letters Patent is hereby corrected as shown below:

Column 7,
Line 31, delete "A".

Signed and Sealed this

Tenth Day of August, 2004

JON W. DUDAS
*Acting Director of the United States Patent and Trademark Office*